United States Patent [19]

Kimura

[11] Patent Number: 5,113,378
[45] Date of Patent: May 12, 1992

[54] OPTICAL TRACKING SYSTEM FOR AN OPTICAL RECORDING ARRANGEMENT WITH PLURALITY OF BEAMS

[75] Inventor: Fumio Kimura, Tokyo, Japan
[73] Assignee: Kabushiki Kaisha CSK, Tokyo, Japan
[21] Appl. No.: 474,087
[22] PCT Filed: Apr. 20, 1989
[86] PCT No.: PCT/JP89/00403
  § 371 Date: Jan. 2, 1990
  § 102(e) Date: Jan. 2, 1990

[30] Foreign Application Priority Data
  Apr. 20, 1988 [JP] Japan ................... 63-97822

[51] Int. Cl.⁵ .............................................. G11B 7/00
[52] U.S. Cl. ...................... 369/44.37; 369/44.38; 369/109; 250/201.5
[58] Field of Search ........... 369/44.37, 44.38, 109, 369/44.29, 44.35, 44.23, 103, 44.41, 44.42, 110, 111, 44.11, 44.12, 44.14; 350/162.2, 162.11; 250/201.5

[56] References Cited
U.S. PATENT DOCUMENTS

| | | | |
|---|---|---|---|
| 4,532,522 | 7/1985 | Tsunoda et al. | 369/44.38 |
| 4,598,393 | 7/1986 | Pierce et al. | 369/109 |
| 4,660,191 | 4/1987 | Maeda et al. | 369/44.37 |
| 4,720,825 | 1/1988 | Kokado | 369/44.37 |
| 4,787,075 | 11/1988 | Matsuoka et al. | 369/44.38 |

FOREIGN PATENT DOCUMENTS

| | | | |
|---|---|---|---|
| 0136959 | 5/1989 | European Pat. Off. | 369/44.11 |
| 0182523 | 9/1985 | Japan | 369/109 |
| 0224147 | 10/1986 | Japan | 369/44.37 |
| 0144236 | 6/1989 | Japan | 369/44.37 |

Primary Examiner—Roy N. Envall, Jr.
Assistant Examiner—Thang V. Tran
Attorney, Agent, or Firm—Max Fogiel

[57] ABSTRACT

An optical recording device which writes and reads data by radiating laser beams from an optical head onto an optical recording medium. A diffraction grating is provided on the optical head and a plurality of laser beams are generated. Some of the laser beams are positioned on a track guide on the above-mentioned optical recording medium. Some of the other laser beams are positioned on another track guide and a plurality of tracking beams are thus constituted. The optical recording device is also provided with a tracking detection circuit for outputting a tracking error signal indicating the difference between the amounts of reflected light to a photo detector which receives light reflected from the above-mentioned optical recording medium for tracking beams and for switching the above-mentioned tracking beams used for tracking. The plurality of tracking beams enables tracking to be performed even when a track guide has defects by switching tracking beams, thereby improving tracking reliability.

4 Claims, 6 Drawing Sheets

OPTICAL TRACKING SYSTEM FOR AN OPTICAL RECORDING ARRANGEMENT WITH PLURALITY OF BEAMS

TECHNICAL FIELD

The present invention relates to an optical recording device which radiates laser beams onto an optical recording medium by an optical head for writing and reading data.

BACKGROUND OF THE INVENTION

In an optical recording device of the prior art, a so-called three-beam method is adopted in which laser beams are made into three diffraction beams by a diffraction grating as shown in FIG. 15. The diffracted beams are converged by a convergent lens whereby the diffracted beams are made main beams used for writing and reading the zero-order diffraction beams and the first-order diffraction beams are made tracking beams.

Tracking is performed in such a way that these two tracking beams are radiated on lines, several microns in width, which are positioned on both sides of an information unit row called a track guide 51 on an optical recording medium and a servo, which makes the amount of reflected light of both tracking beams equal, is then applied, as shown in FIG. 16.

As described above, the above-mentioned optical recording device of the prior art performs tracking by detecting light reflected from the optical recording medium for two tracking beams by using a photo detector. However, it has a drawback that in such a case where there are defects in the track guide 51 of an optical recording medium, tracking cannot be performed on those portions.

SUMMARY OF THE INVENTION

It is an object of the present invention to provide an optical recording device which can perform tracking by switching tracking beams even when there are defects on a track guide, thereby improving tracking reliability. An optical recording device of the present invention which attains the above-mentioned objects is arranged as follows. A diffraction grating is provided on the above-mentioned optical head and a plurality of laser beams are generated. Some of the laser beams are positioned on a track guide on the abovementioned optical recording medium and some other portions are positioned on another track guide, thus constituting a plurality of tracking beams. The optical recording device is also provided with a tracking detection circuit for outputting a tracking error signal indicating the difference between the amounts of reflected light to a photo detector which receives light reflected from the above-mentioned optical recording medium for the tracking beams and for switching the abovementioned tracking beams used for tracking. In a preferred mode, the tracking detection circuit is characterized in that when the value of a tracking error signal of one of the tracking beams exceeds a reference value, the tracking beams are switched to the other tracking beams.

In particular, for example, the tracking system of the present invention selects recording and reading of data by directing laser beams to an optical reading medium with at least two sets of track guides. A main laser beam is generated by an optical head and directed to the recording medium for the selected recording and writing of data. At least two sets of tracking beams are generated by the optical head, and a first set of the tracking beams is positioned on a first set of track guides. A second set of tracking beams are positioned on a second set of track guides for increasing reliability of operation of the tracking system. The tracking detection circuit has an output with a tracking error signal when the first set of track guides have a defect detected by the tracking detection circuit. The tracking detection circuit has a switching arrangement for switching from a tracking error signal detected from the first set of tracking beams to a tracking error signal detected from the second set of tracking beams when the first set of tracking guides have a defect determined from a change in reflected light of the first tracking beams. A tracking error signal detected from the second set of tracking beams becomes operative only after the tracking detection circuit detects a defect on the first set of track guides. A tracking error signal detected from the first set of tracking beams becomes inoperative after switching to a tracking error signal detected from the second set of tracking beams for making operative a tracking error signal detected from the second set of tracking beams.

As explained above, the optical recording device of the present invention is arranged as follows. A diffraction grating is provided on the above-mentioned optical head and a plurality of laser beams are generated. Some of the laser beams are positioned on a track guide on the above-mentioned optical recording medium and some other portions are positioned on another track guide, thus constituting a plurality of tracking beams. The optical recording device is also provided with a tracking detection circuit for outputting a tracking error signal indicating the difference between the amounts of reflected light to a photo detector which receives light reflected from the above-mentioned optical recording medium for the tracking beams and for switching the abovementioned tracking beams used for tracking. As a result of this, since tracking can be performed by switching tracking beams even when a track guide has defects, tracking reliability is improved.

THE BEST MODE FOR CARRYING OUT THE PRESENT INVENTION

The embodiments of the present invention will be explained in detail hereinunder with reference to the drawings.

Figure 1:
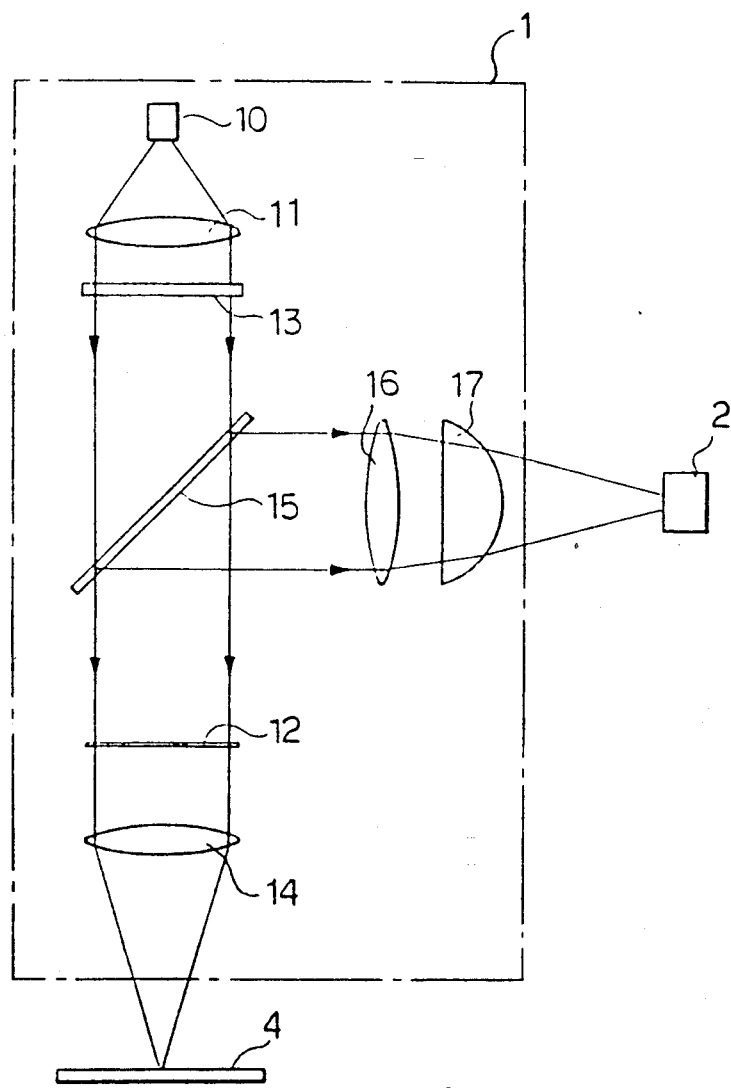
FIG. 1 is a simplified configuration view of one embodiment of the present invention.

FIGS. 1 to 10 show one embodiment in which the present invention is applied to an optical recording device, as an optical recording medium which writes and reads data to and from an optical memory card. The optical recording device in accordance with this embodiment comprises an optical head 1 and an optical detector 2 as shown in FIG. 1.

The optical head 1 comprises a laser diode 10 (LD) which is a light source for laser beams, a collimator lens 11, a quarter-wavelength board 12, a diffraction grating 13, a convergent lens 14 (object lens), a half-mirror 15, a convergent lens 16, and a cylindrical lens 17, where the collimator lens 11 is provided to make the laser beams from the laser diode 10 parallel beams and the quarter-wavelength board 12 converts the laser beams from the laser diode 10 to circularly polarized light. Laser beams sent from the laser diode 10 are converged by the collimator lens 11 and diffracted by the diffraction grating 13, after which the laser beams pass through the half-mirror 15 and the quarterwavelength board 12 and are converged by the convergent lens 14 and a focal point is formed on the optical memory card 4. Laser beams reflected by the optical memory card 4 are reflected by the half-mirror 15, after which they pass through the convergent lens 16 and the cylindrical lens 17 and enter the photo detector 2.

Figure 2:
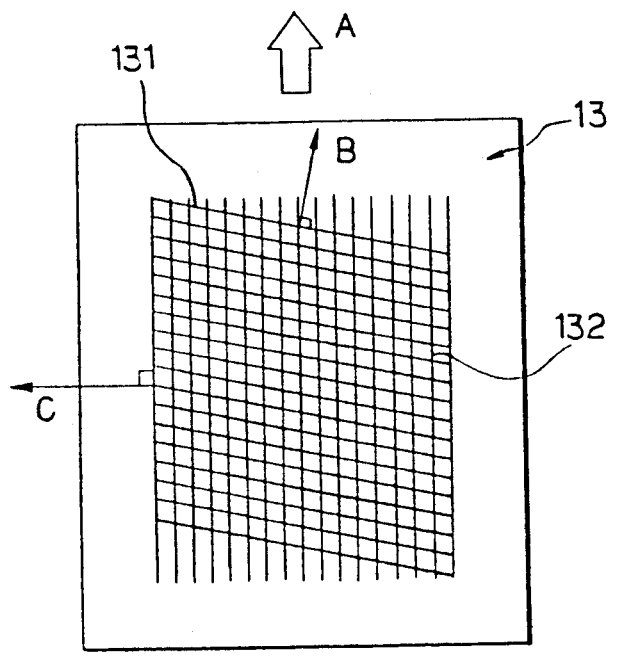
FIG. 2 is a plan view illustrating a diffraction grating employed in one embodiment.
Figure 3:
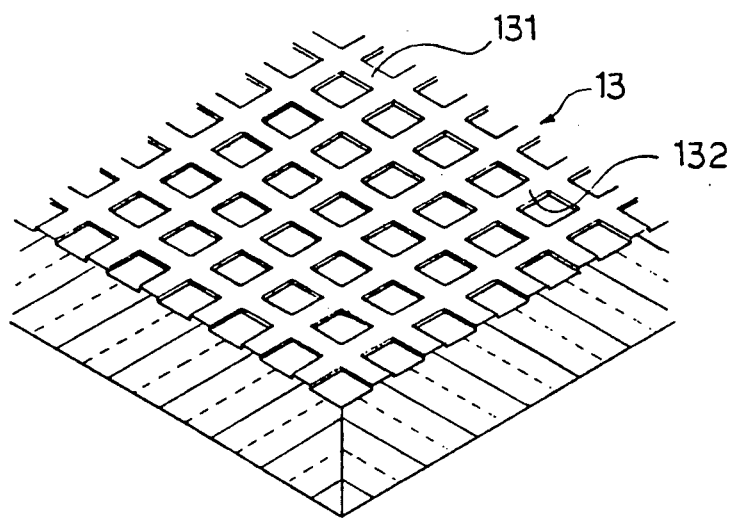
FIG. 3 is a partial cross-sectional view illustrating the diffraction grating.

In the above-mentioned diffraction grating 13, a so-called phase-type diffraction grating with irregular gratings formed in a transparent board is used. The diffraction grating 13 is formed of the two grating groups 131, 132 intersecting to each other at an angle close to 90 degrees and extending in two directions, as shown in FIGS. 2 and 3. Of the two grating groups 131, 132, the grating group 131 extends at the same angle as the intersecting angle between the two grating groups 131, 132 with respect to the direction of the arrow A indicating the scanning direction and the grating group 132 extends in a direction in parallel to the scanning direction A.

Figure 4:
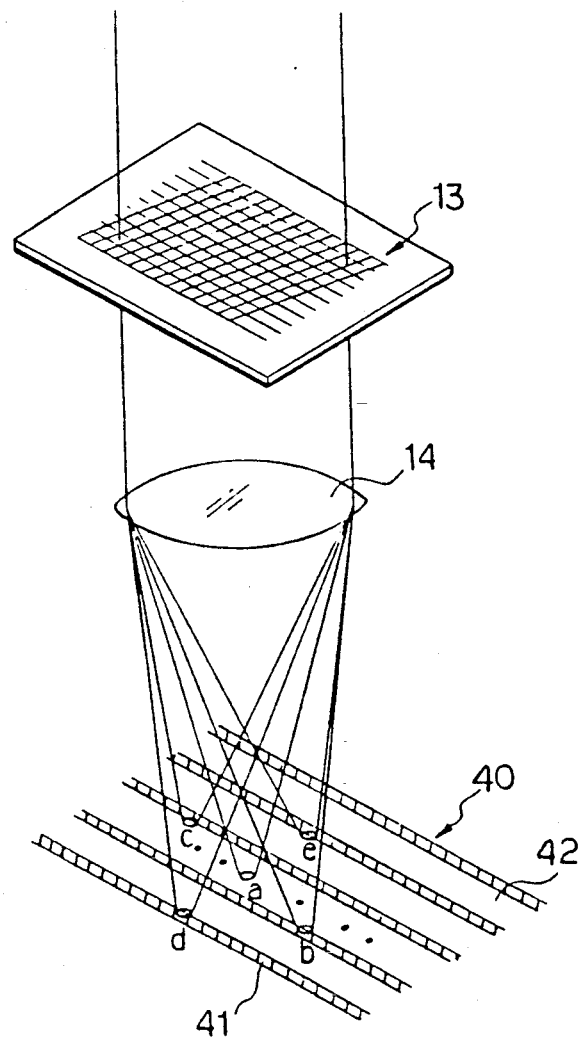
FIG. 4 is a view illustrating the state of image formation of beam spots.
Figure 5:
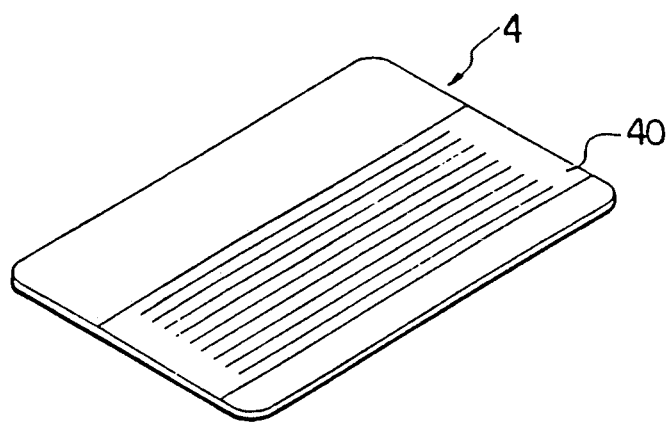
FIG. 5 is a perspective view illustrating a photomemory card.

Use of the above-mentioned diffraction grating 13 causes laser beams which enter the diffraction grating 13 to diffract and travel at a predetermined diffraction angle in the two directions B and C normal to the grating groups 131, 132, respectively. The zero-order and first-order diffracted beams of these two diffracted beams are converged by the convergent lens 16, five beams being formed and five beam spots a, b, c, d and e being formed on the optical memory card 4 as shown in FIGS. 4 and 6.

Among them, the beam spot a is formed by the zero-order diffraction beams by the grating groups 131, 132. By using the beam spot a, writing and reading data to and from the optical memory card 4 is performed. Beam spots b and c are formed by the first-order diffraction beams by the grating group 131, and beam spots d and e are formed by the first-order diffraction beams by the grating group 132. These beam spots b, c, d and e are used as tracking beams. The directions of beam spots b, a and c match the normal direction B of the grating group 131 and the directions of beam spots d, a and e match the normal direction C of the grating group 132.

Figures 6, 7, 8:
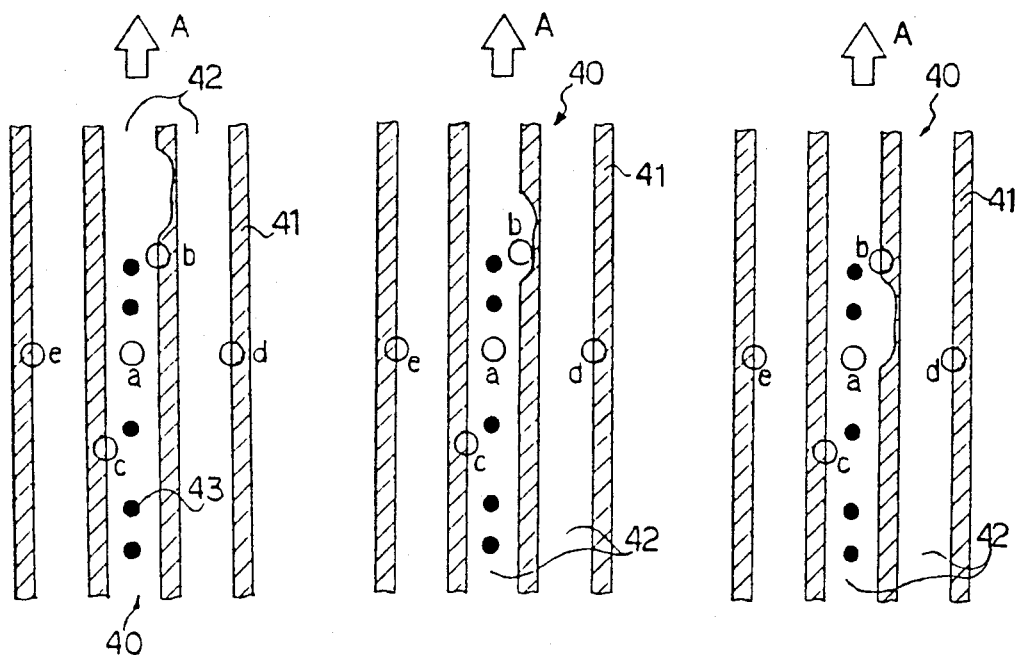
FIGS. 6 to 8 are views illustrating the arrangement state of beam spots with respect to optical recording areas.

The optical memory card 4 used to write and read data is constructed in such a way that an optical recording area 40 is provided on a plastic substrate about the size of a business card and a track guide 41 is provided on the optical recording area 40 at a fixed interval (several 10 μm), as shown in FIG. 6.

The track guide 41 is formed in the form of a band at a fixed width (several μm) and extends continuously in the longitudinal direction of the optical recording area 40. The track guide 41 is used for performing tracking by means of the above-mentioned beam spots and is formed into a state in which it has a reflection factor different from that of the optical recording area 40 by such means as photolithograpy, printing and deposition.

Of the optical recording area 40, the area surrounded by the above-mentioned track guide 41 is a track 42 in which data are written.

In this embodiment, the five beam spots a, b, c, d and e formed by the diffraction grating 13 and the convergent lens 14 are formed at a position as shown in FIG. 6 with respect to the optical recording area 40 of the optical memory card 4.

In other words, the beam spot a used to access data is positioned in correspondence with the track 42. The beam spots b and c used for tracking are positioned in correspondence with the track 41 on both sides of the track 42. Similarly, the beam spots d and e used for tracking are positioned in correspondence with the track 41 on both further sides of the track 42. The beam spots b, c and beam spots d, e are positioned at the track guide 41 on which a half portion of each of them lie and the beam spot a is positioned at the center of the track 42. Each of the beam spots a, b, c, d and e is scanned in the direction of the arrow A and writing and reading of data to and from the optical memory card 4 is performed.

The above-mentioned photo detector 2 is used to receive the images of the above-mentioned five beam spots a, b, c, d and e reflected and sent from the optical memory card 4. The photo detector 2 comprises five light-receiving sections 21 to 25 made up of PIN photo detectors and the like and a tracking detection circuit 3.

Figure 9:
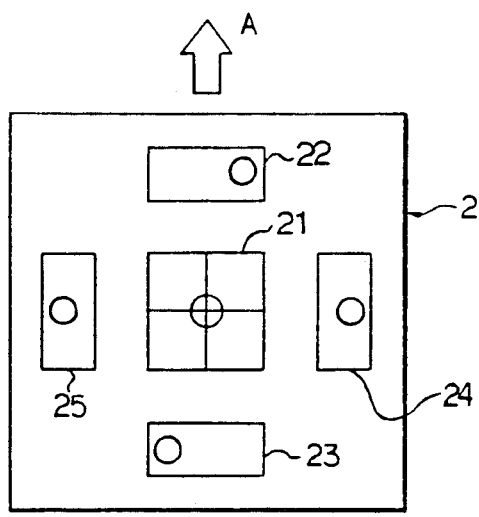
FIG. 9 is a plan view illustrating a photo detector.

The above-mentioned light-receiving sections 21 to 25 are positioned to correspond to the above-mentioned five beam spots a, b, c, d and e, as shown in FIG. 9. They are constructed in such a way that light reflected from each of the beam spots a, b, c, d and e can be reflected separately from each other. For the light-receiving section 21, a photo sensor divided into four divisions, as shown in the figure (e.g., four-division photodiode), is used.

Figure 10:
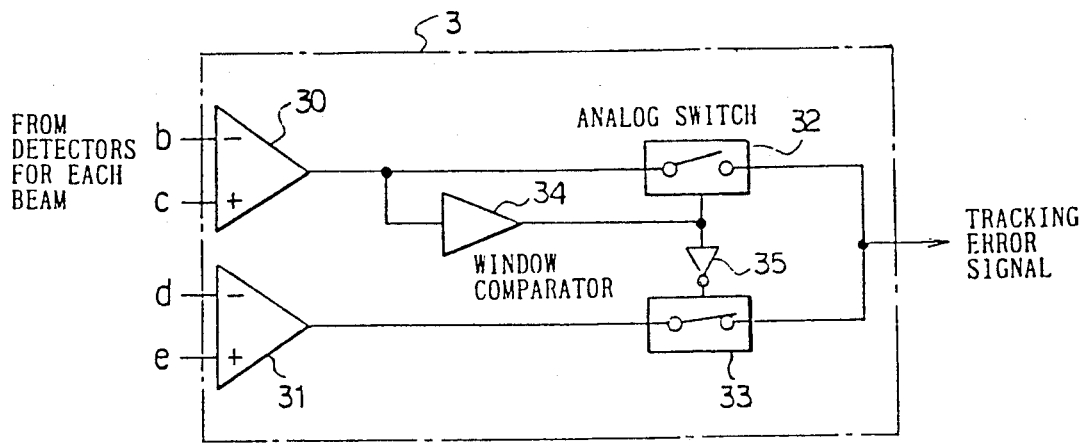
FIG. 10 is a block diagram of a tracking detection circuit.

The above-mentioned tracking detection circuit 3 comprises analog comparators 32, 33, a window comparator 34, and a NOT circuit 35, as shown in FIG. 10.

Light-receiving sections 22, 23 corresponding to beam spots b, c are connected to the analog comparator 30. Light-receiving sections 24, 25 corresponding to beam spots d, e are connected to the analog comparator 31. Analog comparators 30, 31 are connected to analog switches 32, 33 respectively. The window comparator 34 is connected to the section between the output of the analog comparator 30 and analog switches 32, 33. The analog switches 32, 33 are connected to each other via the NOT circuit 35.

When a detection signal from beam spots b, c, d and e is input to analog comparators 30, 31, a tracking error signal is output from any one of the analog switches 32, 33.

Normally, of the analog switches 32, 33, the analog switch 32 is on and the analog switch 33 is off. As mentioned later, when a switching signal is output from the window comparator 34, the analog switch 32 is turned off and the analog switch 33 is turned on.

Next, the operations of writing and reading data in this embodiment constructed as described above will be explained.

Writing and reading data to and from the optical memory card 4 is performed according to a method in which the five beam spots a, b, c, d and e formed by the diffraction grating 13 are positioned as shown in the figure with respect to the optical recording area 40 and scanned in the direction of the arrow A.

Reading data is performed by converting a light-receiving signal from the beam spot a received in the light-receiving section 21 to a binary code. That is, a light-receiving signal varies according to a write bit 43. The variations are converted to binary code and this code is read as data. Writing to the write bit 43 for a track 42 is performed according to a method in which the power of the laser beam is raised to melt the surface of the track 42 in the small area defined by the beam spot a, thereby varying the reflectivity of the spot.

Tracking for data access is performed according to a method in which reflected light from beam spots b, c positioned on the track guide 41 is detected by the light-receiving sections 22, 23, and the detection signals of the light-receiving sections 22, 23 are compared by the analog comparator 30 of the tracking detection circuit 3 to obtain the difference for a tracking error signal.

In FIG. 6, for example, if beam spots b, c deviate to the left in the figure, beam spot b goes off the right track guide 41 and beam spot c lies more on the left track guide 41 with the result that the amount of received light from the beam spot b received by the light-receiving section 22 is larger than the amount of received light from the beam spot c received by the light-receiving section 23. When the difference in received light (d − c) is determined by the analog comparator 30 of the tracking detection circuit 3, a tracking error signal in proportion to the amount of deviation can be obtained.

Tracking is performed by servo control in accordance with the tracking error signal. In this case, for the amount of received light from beam spots d, e received by the light-receiving sections 24, 25, a tracking error signal is not output, since the analog switch 33 is off.

As shown in FIG. 7, in the case where a portion of the track guide 41 on which beam spot b lies is defective and the beam spot b lies on the defective portion, if the difference between the amounts of received light (b − c) obtained by the analog comparator 30 of the tracking detection circuit 3 deviates widely from the 0 level, the window comparator 34 detects it and sends a switching signal to analog switches 32, 33.

The analog switch 32 is turned off and the analog switch 33 is turned on by this switching signal, and tracking by beam spots d, e is performed. That is, by taking the difference between the amounts of received light from beam spots d, e with the analog comparator 31, a tracking error signal is output from the analog switch 33. As in FIG. 8, if beam spot b passes over defects on the track guide 41, the window comparator 34 returns it to the tracking state by beam spots b, c.

As described above, in this embodiment, normally beam spots b, c are used for tracking. When the track guide 41 has defects and the case where accurate tracking cannot be performed arises, tracking is automatically shifted to beam spots d, e. As a result of this, reliable tracking is realized.

Figures 11, 12:
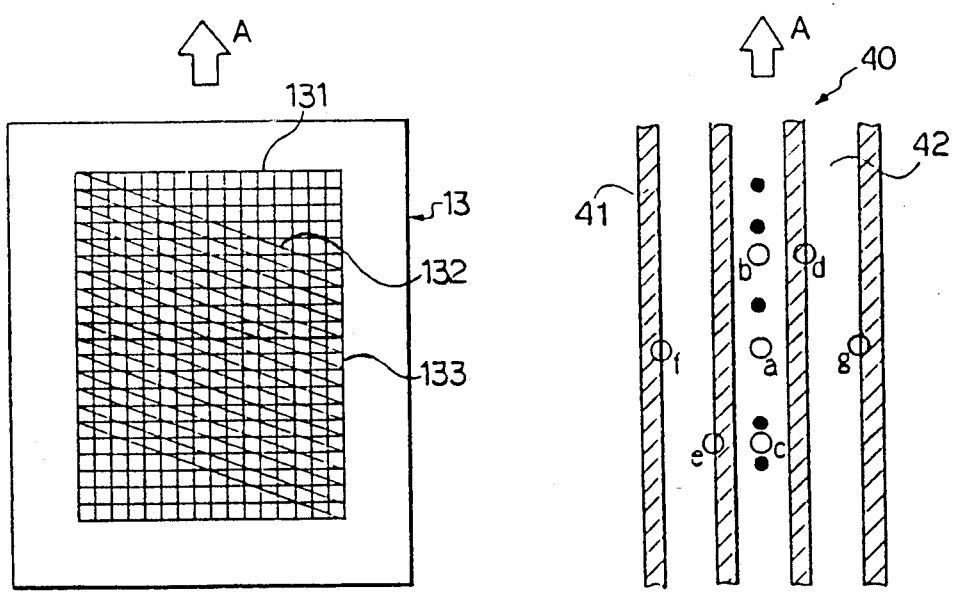
FIG. 11 is a plan view illustrating a diffraction grating in accordance with the second embodiment of the present invention.
FIG. 12 is a view illustrating the state of the arrangement of beam spots of the second embodiment.

For focusing, an astigmatism method in which the focal-point shape of the cylindrical lens 17 is detected by the light-receiving section 21 of the photo detector 2 is used. The second embodiment of the present invention is shown in FIGS. 11 and 12. In this embodiment, three grating groups 131, 132 and 133 are provided on the diffraction grating 13 and the case where seven beam spots a, b, c, d, e, f and g are formed by these grating groups is shown as in the figure.

Among them, for writing and reading data, beam spot a is used; for confirming writing, beam spots b, c are used; for tracking, beam spots d, e, f and g are used. Normally, tracking is performed by beam spots d, e and when the track guide 41 has defects, tracking is shifted to beam spots f, g from beam spots d, e. The tracking detection circuit 3 of this embodiment is the same as that of the first embodiment.

Figure 13:
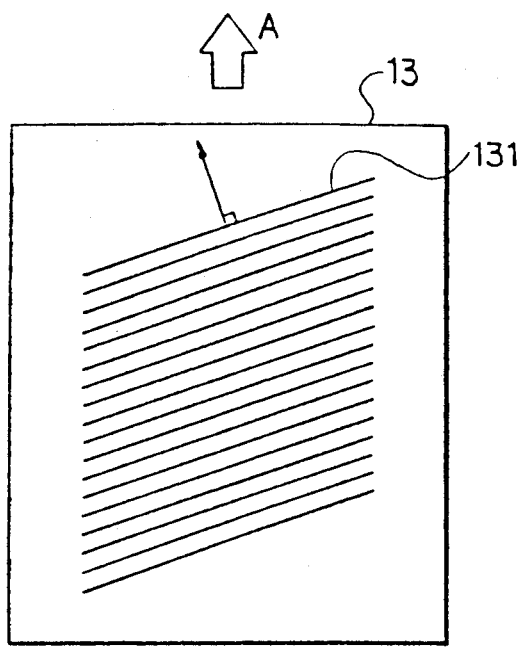
FIG. 13 is a plan view illustrating a diffraction grating in accordance with the third embodiment of the present invention.
Figure 14:
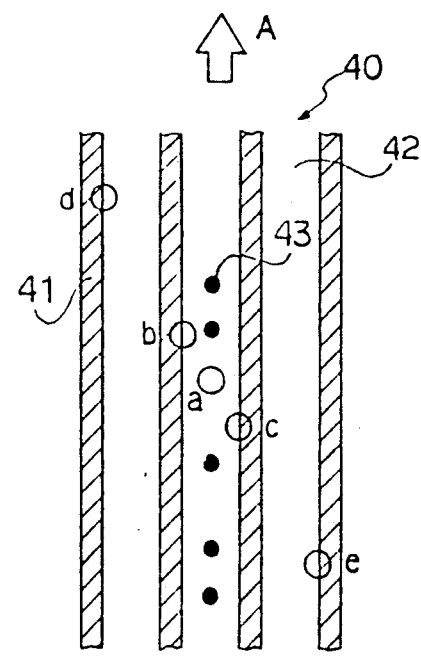
FIG. 14 is a view illustrating the state of the arrangement of beam spots of the third embodiment.
Figure 15:
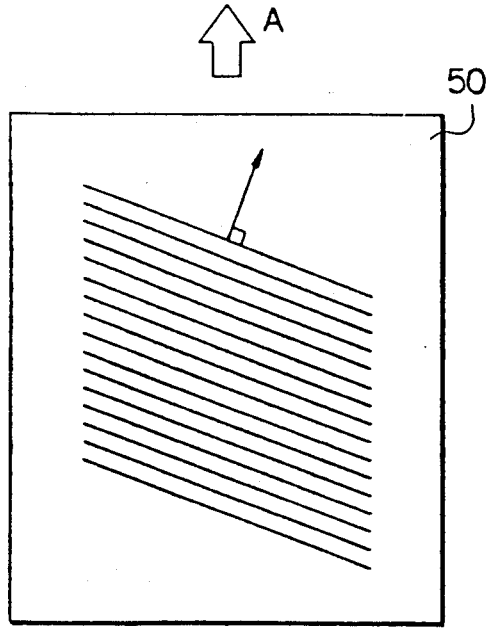
FIG. 15 is a plan view illustrating a diffraction grating of the prior art.
Figure 16:
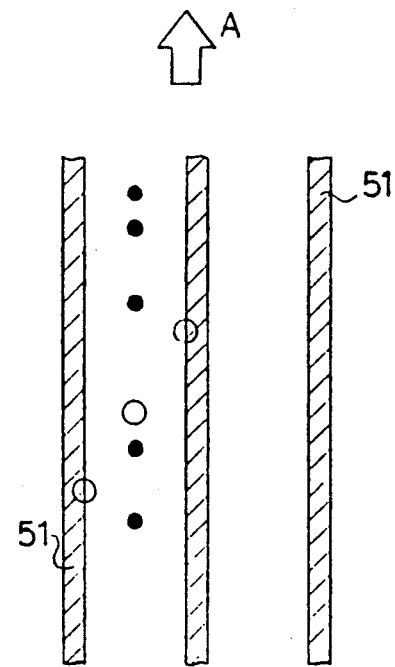
FIG. 16 is a view illustrating the state of the arrangement of beam spots of the prior art.

In the third embodiment shown in FIGS. 13, 14, a plurality of diffraction group 131 are not provided on the diffraction grating 13, but instead a single diffraction group 131 and five beam spots a, b, c, d and e arrayed in one row as shown in the figure are formed by diffracted light from the zero order to the second order. In the same manner as in the first embodiment, beam spots b, c, d and e are used for tracking. It goes without saying that the light-receiving sections 21 to 25 of the photo detector 2 are positioned in one row corresponding to beam spots a, b, c, d and e in this instance. The tracking detection circuit 3 is arranged similarly to that shown in FIG. 10.

The arrangement of the diffraction grating is not limited to those shown in the above-mentioned embodiments. By changing the direction and number of diffraction groups, different beam spots can be obtained. A diffraction grating can take the form of an amplitude type or reflection type rather than be limited to a phase type. For an optical recording medium, an optical memory card is explained. However, optical disks can also be employed similarly to optical memory cards.

ADVANTAGES OF THE INVENTION

As set forth hereinabove, an optical recording device of the present invention is arranged as follows. A diffraction grating is provided on an optical head and a plurality of laser beams are generated. Some of the laser beams are positioned on a track guide on an optical recording medium and some other portions are positioned on another track guide, thus constituting a plurality of tracking beams. The optical recording device is also provided with a tracking detection circuit for outputting a tracking error signal indicating the difference between the amounts of reflected light is output to a photo detector which receives light reflected from the above-mentioned optical recording medium for the tracking beams and for switching the above-mentioned tracking beams used for tracking. As a result of this, since tracking can be performed by switching tracking beams even when a track guide has defects, tracking reliability is improved.

What is claimed is:

1. A tracking system for an optical recording arrangement with means for selected recording and reading data by directing laser beams to an optical recording medium with at least two sets of track guides, comprising: an optical head for generating a main laser beam directed to said recording medium for said selected recording and writing of data, said optical head generating also at least two sets of tracking beams; means for positioning a first set of said tracking beams on a first set of said track guides; means for positioning a second set of said tracking beams on a second set of said track guides for increasing reliability of operation of said tracking system; tracking detection means having an output with a tracking error signal when said first set of track guides have a defect detected by said tracking detection means; and switching means in said tracking detection means for switching from a tracking error signal detected from the first set of tracking beams to a tracking error signal detected from the second set of tracking beams when said first set of track guides have a defect determined from a change in reflected light of the first tracking beams; a tracking error signal detected from said second set of tracking beams becoming operative only after said tracking detection means detects a defect on said first set of track guides; a tracking error signal detected from said first set of tracking beams becoming inoperative after switching to a tracking error signal detected from said second set of tracking beams for making a tracking error signal detected from said second set of tracking beams operative.

2. A tracking system as defined in claim 1, including a diffraction grating on said optical head for generating said at least two sets of tracking beams.

3. A tracking system as defined in claim 1, including means for comparing said tracking error signal from said tracking detection means with a reference value, said switching means switching from said tracking error signal detected from said first tracking beams to said tracking error signal detected from said second tracking beams when the tracking error signal exceeds said reference value.

4. A tracking system for an optical recording arrangement with means for selected recording and reading data by directing laser beams to an optical recording medium with at least two sets of track guides, comprising: an optical head for generating a main laser beam directed to said recording medium for said selected recording and writing of data, said optical head generating also at least two sets of tracking beams; means for positioning a first set of said tracking beams on a first set of said track guides; means for positioning a second set of said tracking beams on a second set of said track guides for increasing reliability of operation of said tracking system; tracking detection means having an output with a tracking error signal when said first set of track guides have a defect detected by said tracking detection means; and switching means in said tracking detection means for switching from a tracking error signal detected from the first set of tracking beams to a tracking error signal detected from the second set of tracking beams when said first set of track guides have a defect determined rom a change in reflected light of the first tracking beams; a tracking error signal detected from said first set of tracking beams becoming operative only after said tracking detection means detects a defect on said first set of track guides; a tracking error signal detected from said first set of tracking beams becoming inoperative after switching to a tracking error signal detected from said second set of tracking beams for making a tracking error signal detected from said second set of tracking beams operative; means for comparing said tracking error signal from said tracking detection means with a reference value, said switching means switching from said tracking error signal detected from said first tracking beams to said tracking error signal detected from said second tracking beams when the tracking error signal exceeds said reference value; a diffraction grating on said optical head for generating said main laser beam and said two sets of tracking beams; said optical head having a laser diode for a source of light; a collimator lens for producing parallel beams from light emitted by said laser diode; a quarter-wavelength board for converting said parallel beams to circularly polarized light; said diffraction grating receiving light from said collimator for diffracting said light and transmitting the diffracted light through a half-mirror and to said quarter-wavelength board; a convergent lens for converging light received from said quarter-wavelength board and focusing the converged light onto an optical memory card; said diffraction grating having irregular gratings with two grating groups intersecting each other at an angle of substantially 90° and extending in two directions.

* * * * *